United States Patent
Deckers et al.

(12)

(10) Patent No.: US 6,169,148 B1
(45) Date of Patent: *Jan. 2, 2001

(54) PREPARATION OF OXIDIZED POLYOLEFIN WAXES

(75) Inventors: Andreas Deckers, Flomborn; Wilhelm Weber, Neustadt; Dietmar Ebisch, Ludwigshafen, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/004,340

(22) Filed: Jan. 8, 1998

(30) Foreign Application Priority Data

Jan. 14, 1997 (DE) ............................... 197 00 892

(51) Int. Cl.$^7$ ....................................... C08F 8/06
(52) U.S. Cl. .................. 525/333.8; 525/52; 525/383; 525/388
(58) Field of Search .................. 525/333.8, 52, 525/388, 383

(56) References Cited

U.S. PATENT DOCUMENTS

| 3,285,902 | * | 11/1966 | Schmeidl ................. 525/333.8 |
| 3,756,999 | | 9/1973 | Stetter et al. . |
| 3,931,024 | * | 1/1976 | Hu ......................... 252/51.5 R |
| 5,028,666 | * | 7/1991 | Clarke .......................... 525/388 |
| 5,064,908 | | 11/1991 | Schuster et al. ............... 525/333 |
| 5,478,962 | | 12/1995 | Denardo et al. ............... 558/277 |

FOREIGN PATENT DOCUMENTS

| 002760 | 12/1978 | (EP) . |
| 271261 | 6/1988 | (EP) . |
| 474889 | 3/1992 | (EP) . |
| 1425994 | 3/1965 | (FR) . |

OTHER PUBLICATIONS

Kunststoff–Handbuch, Band IV, 1969–162–165.

* cited by examiner

*Primary Examiner*—Fred Zitomer
(74) *Attorney, Agent, or Firm*—Keil & Weinkauf

(57) ABSTRACT

A process for preparing oxidized polyolefin waxes by reacting polyolefin waxes with oxygen or oxygen-containing gases at from 140 to 200° C. and at pressures of from 5 to 200 bar involves conducting the oxidation reaction continuously in a tube reactor but excludes the reaction of polyolefins prepared by metallocene catalysis.

9 Claims, No Drawings

PREPARATION OF OXIDIZED POLYOLEFIN WAXES

The present invention relates to a process for preparing oxidized polyolefin waxes by reacting such waxes with oxygen or oxygen-containing gases at from 140 to 200° C. under pressures of from 5 to 200 bar.

The invention also relates to oxidized polyolefin waxes obtainable by this process and to their use in or as coating compositions and in or as floor care compositions.

The oxidation of polyolefin waxes with oxygen or oxygen-containing gases has been known for a long time (see for example Kunststoff Handbuch, Vol. 4, Carl-Hanser-Verlag, Munich 1969 p. 162–165). It is generally performed by melting the polyolefin wax to be oxidized and then bringing the melt into contact with the oxidizing gas. The oxidation is generally conducted in stirred autoclaves. Continuous processes normally utilize two or more autoclaves in a cascade arrangement. The disadvantage of these cascades of stirred vessels is in particular that the wax molecules have very different residence times in each autoclave and, accordingly, the oxidation products are very heterogeneous, with fractions of very highly oxidized and fractions of very slightly oxidized wax molecules.

Prior German Patent Application 19 617 230.6 describes oxidized waxes obtainable by oxidation of polyolefins—themselves obtainable by metallocene catalysis—and processes for their preparation. For the oxidation of these waxes the possibility is referred to of conducting this reaction in a tube reactor.

It is an object of the present invention, then, to find a process for preparing oxidized polyolefin waxes which can be operated continuously, produces good space-time yields and leads to products having a narrow acid-number distribution.

We have found that this object is achieved by a process for preparing oxidized polyolefin waxes by reacting polyolefin waxes with oxygen or oxygen-containing gases at from 140 to 200° C. and at pressures of from 5 to 200 bar, which comprises conducting the oxidation reaction continuously in a tube reactor but excludes the reaction of polyolefins prepared by metallocene catalysis.

We have also found new, oxidized polyolefin waxes obtainable by this process and the use of these oxidized polyolefin waxes in or as coating compositions and in or as floor care compositions.

The oxidation of the polyolefins on which the oxidized waxes are based can be carried out with oxygen or with gases containing it. It is preferred to use air to oxidize the polyolefins. To support the oxidation it is possible to add organic peroxides, such as di-tert-butyl peroxide, for example; the addition of heavy metal salts, such as manganese acetate, is also conceivable.

The choice of oxidation temperature depends on the desired degree of oxidation, on the residence time of the wax in the reactor and on the nature and amount of the oxidizing gas. Below 140° C. the space-time yields are generally unacceptable; above 200° C. there is an increasing risk of oxidative cracking of the waxes and, associated therewith, the risk of contaminated oxidation product and rapid soiling of the reactor. Ranges that have been found suitable are from 150 to 190° C., especially from 160 to 180° C.

Particularly good space-time yields are obtained if the internal temperature of the tube reactor is maintained over the entire reactor length at the same, optimum and—as far as possible—constant level. This can be achieved in accordance with the invention if the heating jacket of the tube reactor has at least two different temperature zones of which the zone in the first part of the tube reactor (front zone) is set from 5 to 20° C. higher than that in the rear part of the reactor (rear zone). In this way a constant internal temperature can be attained.

The reaction pressure is from 5 to 200 bar, it being preferred to operate at a pressure of from 10 to 60 bar and, with particular preference, at from 20 to 50 bar.

Reactors which can be used are bundled tube reactors or customary high-pressure reactors, as are also used, for example, for olefin polymerization or copolymerization. The tube reactor must be dimensioned such that the wax has an adequate residence time in the reactor and that there is a sufficiently turbulent flow, thereby ensuring adequate mixing of the two-phase reaction mixture. In general, tube reactors with a length/diameter ratio of from 2000 to 50,000, preferably from 5000 to 30,000, are used. Good results can be achieved, for example, in tube reactors with a length of from 200 to 2000 m, preferably from 500 to 1000 m, and a diameter of from 2 to 6 cm, preferably from 3 to 5 cm.

An important factor for the balancing of good space-time yield with low oxidative cracking is the residence time of the wax in the reactor. The optimum residence time depends, in turn, on the oxidation temperature and on the oxygen partial pressure. Particularly good results are generally obtained at mean residence times of from 0.5 to 20 hours, preferably from 1 to 10 hours and, with particular preference, from 1 to 5 hours.

Suitable starting materials for the novel oxidation process are all customary polyolefin waxes, such as those prepared by Ziegler or Phillips catalysis or by high-pressure processes. The starting waxes can be taken directly from a polymerization process or obtained by thermal cracking of olefin polymers of relatively high molecular mass.

Highly suitable waxes are derived, for example, from ethylene and/or $C_3$–$C_{10}$-alk-1-enes, such as from propylene, 1-butene, 1-pentene, 1-hexene, 1-heptene, 1-octene, 1-nonene and 1-decene. Preferred polyolefin waxes used are homopolymers or copolymers of ethylene or propylene, especially those of ethylene.

To prepare the starting polyolefin waxes it is possible to subject the monomers to homopolymerization or to copolymerization in any ratio with one another. Preferred polyolefins on which the oxidized waxes are based are ethylene homopolymers with a density in the range from 0.89 to 0.98 g/cm$^3$, preferably in the range from 0.90 to 0.96 g/cm$^3$, and with a $M_w$, determined by the GPC method in 1,2,4-trichlorobenzene at 135° C. using a polyethylene or polypropylene standard, in the range from 1000 to 40,000 g/mol, preferably in the range from 2000 to 20,000 g/mol.

Other suitable starting polyolefins are ethylene-$C_3$–$C_{10}$-alk-1-ene copolymers with an overall content in the copolymer of structural units derived from the alk-1-ene or the alk-1-enes in the range from 0.1 to 15 mol-%, preferably in the range from 1 to 10 mol-%, based on the copolymer. Preferred ethylene-alk-1-ene copolymers are ethylene-propylene copolymers with a content in the copolymer of structural units derived from the propylene in the range from 0.1 to 10 mol-%, preferably in the range from 1 to 5 mol-%, based on the copolymer. The copolymers generally have a $M_w$, determined by the method of GPC as described above, in the range from 1000 to 40,000 g/mol, preferably in the range from 2000 to 20,000 g/mol.

Other preferred polyolefins on which the oxidized waxes can be based are isotactic propylene homopolymers having a content mmmm of isotactic pentads, determined by the method of $^{13}$C-NMR spectroscopy, in the range from 90 to 98% and a $M_w$, determined by the GPC method as described above, in the range from 1000 to 40,000 g/mol, preferably in the range from 2000 to 20,000 g/mol.

Also suitable are copolymers of propylene with ethylene and/or $C_4$–$C_{10}$-alk-1-enes as base polyolefins. These propylene copolymers usually have an overall content in the copolymer of structural units derived from the ethylene and/or from the $C_4$–$C_{10}$-alk-1-enes in the range from 0.1 to 15 mol-%, preferably in the range from 1 to 10 mol-%, based on the copolymer. Preferred propylene copolymers are propylene-ethylene copolymers having a content in the copolymer of structural units derived from the ethylene in the range from 0.1 to 10 mol-%, preferably in the range from 1 to 5 mol-%, based on the copolymer. The propylene copolymers generally have a $M_w$, determined by the GPC method as described above, in the range from 1000 to 40,000 g/mol, preferably in the range from 1000 to 20,000 g/mol.

Another influential parameter of the novel process is the ratio of flow rates of wax and oxidizing gas through the tube reactor. This ratio influences both the extent of turbulence, and thus the extent of mixing of the reaction mixture, and the amount of oxidizing agent with which the wax is able to come into contact. The ratio of the flow rates of oxidizing gas and wax is advantageously from 30 to 500, preferably from 50 to 300.

The oxidized polyolefin waxes preparable by the novel process feature a particularly narrow acid-number distribution. Moreover, they exhibit only a very low level of contamination by cracking products, referred to as black spots. Thus it is possible, for example, to prepare waxes, even those having a high degree of oxidation, without a significant proportion of such contaminants.

The acid numbers (determined in accordance with DIN 53 402) are a measure of the degree of oxidation of the oxidized waxes and correlate with the dispersibility of the waxes in water. In general, therefore, medium to high acid numbers are desirable, although very high acid numbers may lead to products of relatively low hardness.

Using the process according to the invention it is possible, for example, to obtain oxidized polyolefin waxes having acid numbers of from 1 to 150. For many utilities, those oxidized polyolefin waxes having acid numbers of from 10 to 50 are advantageous, and those having acid numbers of from 15 to 35 are particularly preferred.

The novel waxes are used, for example, in or as coating compositions. As a result of their ready dispersibility, without forming lumps, these waxes can be used to obtain particularly uniform wax coatings, for example on citrus fruits or on automotive coatings.

The great ease of dispersibility also permits the advantageous use of the novel waxes in or as floor care compositions.

EXAMPLES

The example experiments were conducted in a two-part tube reactor having an internal diameter of 4 cm and an overall length of 700 m. The two parts of the tube, which were equal in length, could be set at different jacket temperatures $T_1$ (front part) and $T_2$ (rear part). The starting product was a high-pressure polyethylene wax with a density of 0.92 g/ml and a melt viscosity (at 120° C.) of 1000 mm$^2$/s. The temperature levels and flow rates were chosen so as to give an acid number of about 20. For each experiment, the frequency of black spots in the product was examined.

The table below shows the results.

TABLE

| Example No. | Wax throughput [l/h] | Air throughput [m$^3$/h] | Ratio $v_{air}/v_{wax}$ | $T_1$ [° C.] | $T_2$ [° C.] | Acid number | Black Spots per 100 g of wax |
|---|---|---|---|---|---|---|---|
| 1 | 700 | 130 | 186 | 170 | 160 | 20.3 | ≦1 |
| 2 | 900 | 130 | 143 | 170 | 160 | 20.6 | ≦1 |
| 3 | 700 | 50 | 72 | 170 | 160 | 19.9 | ≦1 |
| 4 | 700 | 130 | 186 | 190 | 180 | 20.5 | ≦1 |

We claim:

1. A process for preparing oxidized poly-1-olefin waxes by reacting poly-1-olefin waxes with oxygen-containing gases at from 140 to 200° C. and at a pressure of from 5 to 200 bar, which process comprises conducting the oxidation reactions continuously in a tube reactor having a length/diameter ratio of from 2,000 to 50,000; wherein the ratio of the flow rates of the oxidizing gas and wax is from 30 to 500; which process excludes the reaction of polyolefins prepared by metallocene catalysis.

2. A process as claimed in claim 1, wherein the mean residence time of the wax in the tube reactor is from 0.5 to 20 hours.

3. A process as claimed in claim 2, wherein the poly-1-olefin waxes employed are homopolymers or copolymers of ethylene.

4. A process as claimed in claim 2, wherein air is employed as oxygen-containing gas.

5. A process as claimed in claim 2, wherein the ratio of the flow rates of oxidizing gas and wax is from 30 to 400.

6. A process as claimed in claim 2, wherein the heating jacket of the tube reactor has at least two different temperature zones of which the front zone is set from 5 to 20° C. higher than the rear zone.

7. The process of claim 1, carried out in a bundled tube reactor.

8. The process of claim 1 wherein the oxygen containing gas is air and the air throughput is 10,400 liter cm$^{-2}$h$^{-1}$.

9. The process of claim 1 wherein the oxygen containing gas is air and the air throughput is 4000 liter cm$^{-2}$h$^{-1}$.

* * * * *